Sept. 3, 1968 G. K. ANDERSON ET AL 3,399,545
APPARATUS FOR CONNECTING A STATIONARY AIR
CONDITIONING UNIT TO AIRCRAFT
Filed May 23, 1967
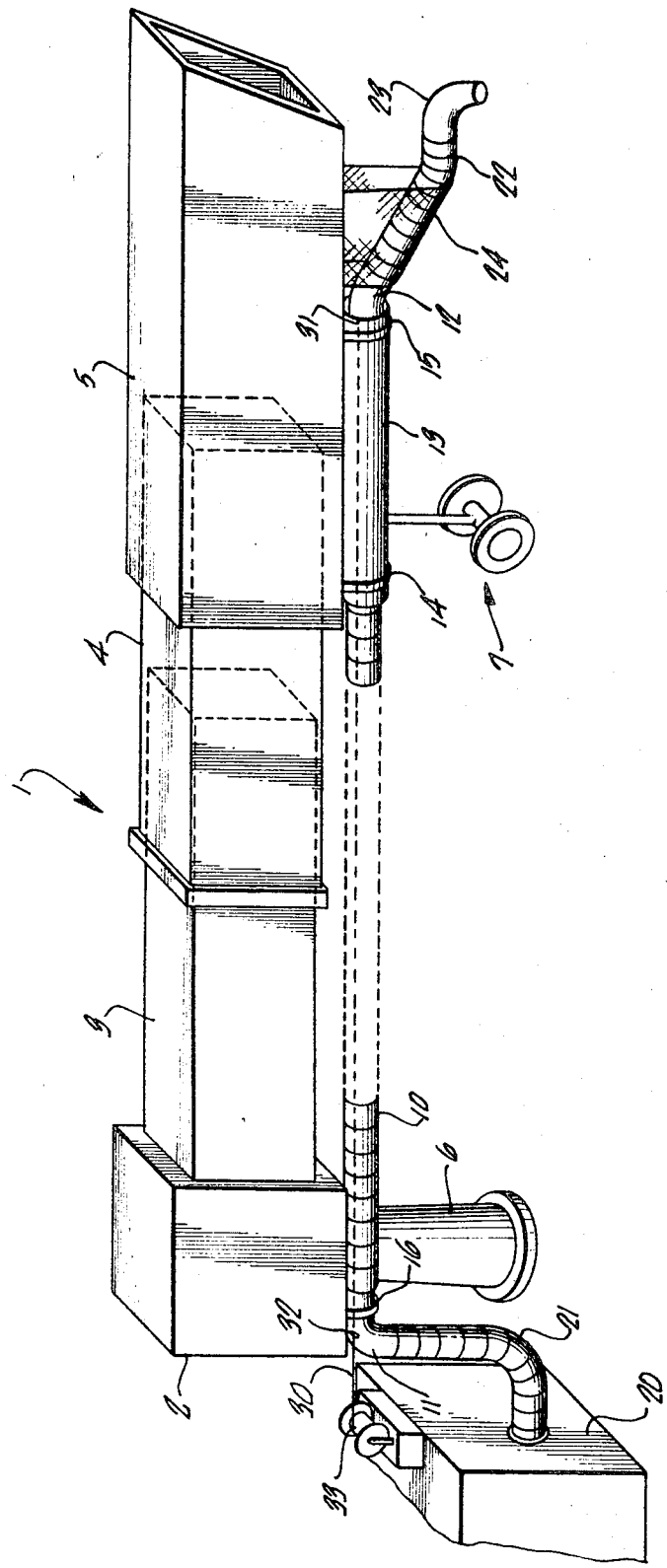
INVENTORS.
GORDON K. ANDERSON
RICHARD A. EVANS
RALPH H. HILMER
BY Christie, Parker & Hale
ATTORNEYS.

United States Patent Office 3,399,545
Patented Sept. 3, 1968

3,399,545
APPARATUS FOR CONNECTING A STATIONARY AIR CONDITIONING UNIT TO AIRCRAFT
Gordon K. Anderson, Tustin, Richard A. Evans, Newport Beach, and Ralph H. Hilmer, Corona Del Mar, Calif., assignors to Lear Siegler, Inc., Santa Monica, Calif., a corporation of Delaware
Filed May 23, 1967, Ser. No. 640,604
14 Claims. (Cl. 62—237)

ABSTRACT OF THE DISCLOSURE

A longitudinally expandable duct is attached to the two relatively movable end sections of a telescoping, aircraft passenger-loading bridge. Thus, the conduit is integrated with the bridge structure as a single unit, changing in length with the bridge as the bridge is extended and contracted. A supporting cable under tension extends through the interior of the duct along the top surface thereof. Preferably, one end of the cable is attached to the duct at one end, and at the other, it is wrapped around a reel that maintains a constant tension on the cable. In its contracted condition, the duct is stored in a tube attached to the bridge. One end of the duct is fixed relative to the tube, and the other end of the duct emerges from the tube as the bridge is extended.

Background of the invention

This invention relates to fluid conveying systems and, more particularly, to apparatus especially suited for carrying preconditioned air to aircraft during loading and unloading.

It is customary to supply preconditioned air from an external source to aircraft on the ground during loading and unloading. If a portable air conditioning unit is employed to supply the preconditioned air, the unit is simply moved up to the aircraft and a short length of duct is used to convey the preconditioned air from the unit to the aircraft.

If the air conditioning unit is a stationary type, however, the problem of conveying the preconditioned air to the aircraft is not so easily solved. In some cases, the duct connecting the air conditioning unit and the aircraft is installed underground. This practice has several advantages. Thus, the loading area is not cluttered by a long length of duct extending above ground; the duct is protected from the elements; and the inconvenience involved in removing and storing the length of duct after each use is obviated. On the other hand, the practice of placing the length of duct underground has several distinct disadvantages. It is costly and inconvenient to install a duct underground in an existing airport facility because the surface of the loading area must be torn up. Further, flexibility in the arrangement of the aircraft in the loading area is lost because the location of the underground ducts dictates the location of the aircraft.

Summary of the invention

According to the invention, a longitudinally expandable duct used to carry preconditioned air from an air conditioning unit to aircraft is attached to a telescoping, passenger-loading bridge. The position of two points of the duct is fixed relative to two movable sections, preferably the end sections, of the bridge. Thus the bridge and the duct are integrated in a single unit, both expanding together for use and contracting together for storage. This arrangement possesses all the advantages of an underground duct enumerated above without any of the disadvantages.

A feature of the invention is a supporting cable under tension that extends through the interior of the duct along the top surface thereof between the two relatively fixed points. Preferably the cable is fastened at one end, and at the other end is wound on a reel maintaining a substantially constant tension on the supporting cable.

Another feature of the invention is the provision of a tube in which the expandable duct is stored when the bridge is contracted. The storage tube surrounds the duct and is fixed relative to one end of the duct.

Brief description of the drawing

The features of a specific embodiment of the invention are illustrated in the drawing, the single figure of which is a perspective view of a system for conveying air according to the principles of the invention.

Description of a specific embodiment

In the drawing, a telescoping, aircraft passenger-loading bridge 1 is shown having immovable sections 2 and 3 and longitudinally movable telescoping sections 4 and 5. Immovable section 2 is mounted on a pedestal 6 and movable section 5 is mounted on a wheel assembly 7. Bridge 1 could be any of several commercially available types of telescoping structures with a plurality of relatively movable sections. Generally, wheel assembly 7 would be motor-driven and steered by an operator situated within section 5 directly above wheel assembly 7. Bridge 1 is extended and contracted by driving wheel assembly 7.

A long expandable duct 10 extends horizontally along the bottom of bridge 1. Duct 10 is connected at one end to a 90-degree elbow joint 11 and at the other end to a 45-degree elbow joint 12. A storage tube 13 surrounds duct 10. Elbow joint 12 is fastened to tube 13 at one end, with the result that the position of one end of duct 10 is fixed relative to storage tube 13. Storage tube 13 is attached to the bottom of section 5 by brackets 14 and 15, and elbow joint 11 is attached to the bottom of fixed section 2 by a bracket 16. Thus, the position of one end of duct 10 is fixed relative to section 2, and the position of the other end of duct 10 is fixed relative to section 5. A stationary air conditioning unit 20 is connected to elbow 11 by a duct 21. A duct 22 connects elbow joint 12 to a 120-degree reducing elbow joint 23 to which a standard quick-connect coupling (not shown) suitable for mating to the air conditioning inlet of the aircraft is fitted. Duct 22 is stored in a basket 24 when not connected to an aircraft. Instead of basket 24 a storage tube could be employed. Ducts 10, 21, and 22 are preferably the commercially available type constructed of steel spiral ribbing covered by a pliable heat-insulative material. In such case, the spiral ribbing functions as a spring to insure that duct 10 expands and contracts uniformly along its length.

A supporting cable 30 extends through the interior of duct 10 along its top surface. Cable 30 is preferably surrounded by a nylon sheath to reduce wear on the inside surface of conduit 10 as cable 30 slides across it. Cable 30 could have a circular cross section or a flat cross section in the nature of a ribbon. At one end, cable 30 is fixed to a point, designated 31 in the drawing, on the interior of the end of duct 10. At the other end, cable 30 passes through a tight-fitting grommet 32 in elbow joint 11 and is wrapped around a cable tension reel 33 fixed to unit 20. Reel 33, which could be of any commercially available type, serves to maintain a substantially constant tension on cable 30 by winding and unwinding portions of cable stored on the reel. Although reel 33 is particularly compact, other arrangements for maintaining a constant tension on cable 30 could be employed. For example, the constant tension on cable 30 could be provided by a weight hanging from the end of the cable. The vertical distance of travel of the weight would preferably be reduced by a pulley arrangement.

When passenger bridge 1 is contracted for storage, the length of duct 10 is also contracted and duct 10 is stored completely within tube 13. As bridge 1 is expanded in preparation for use and section 5 moves from left to right (as viewed in the drawing), duct 10 emerges from tube 13 and expands in length in correspondence with the extension of bridge 1. As section 5 moves from left to right, the end of cable 30 at point 31 moves with it, away from reel 33. To maintain a constant tension on cable 30, reel 33 unwinds additional length of cable, which passes through grommet 32 to the inside of duct 10.

Sufficient tension is maintained on cable 30 to prevent appreciable sagging at the middle in the extended condition. Accordingly, duct 10 is maintained substantially straight in a horizontal position at all times.

What is claimed is:

1. Apparatus for carrying fluid along a telescoping structure having a plurality of relatively movable sections comprising: a longitudinally expandable duct and means for supporting the duct at two spaced-apart points, the supporting means being adapted to couple the two spaced-apart points of the duct to different sections of the structure so the length of the duct changes as the sections move relative to each other.

2. The apparatus of claim 1, in which a supporting cable under tension extends through the interior of the duct along the top surface thereof between the two spaced-apart points.

3. The apparatus of claim 2, in which the cable is attached at one end to the duct at one of the spaced-apart points and held at the other end by means stationary relative to the other spaced-apart point for adjusting the length of the cable between the two spaced-apart points as the length of the duct changes.

4. The apparatus of claim 3, in which the cable adjusting means is a cable tension reel around which the cable is wrapped.

5. The apparatus of claim 3, in which the cable adjusting means maintains the cable under a substantially constant tension.

6. The apparatus of claim 2, in which the cable is surrounded by a nylon sheath.

7. The apparatus of claim 1, in which a tube surrounds the duct, the position of one of the two spaced-apart points of the duct being fixed relative to the tube so the duct moves into the interior of the tube as the length of the duct decreases.

8. The apparatus of claim 1, in which the duct comprises an expandable spiral ribbing covered with a pliable material.

9. An air conditioning system comprising: a unit for producing conditioned air; a longitudinally expandable duct connected at one end to the outlet of the unit; and means for supporting the duct at two spaced-apart points, the supporting means being adapted to couple the two spaced-apart points of the duct to different sections of a telescoping structure so the length of the duct changes as the sections move relative to each other.

10. The system of claim 9, in which a supporting cable under tension extends through the interior of the duct along the top surface thereof between the two spaced-apart points.

11. The system of claim 9, in which a storage tube surrounds the duct, the position of the one point of the duct being fixed relative to the tube.

12. Apparatus for conveying fluid comprising: a longitudinally extendable structure having first and second relatively movable sections; a longitudinally expandable duct for conveying fluid along the length of the structure; means for fixing the position of one point of the duct relative to the first section of the structure; and means for fixing the position of another point of the duct relative to the second section of the structure so that as the first and second sections of the structure move with respect to one another, the length of the duct changes in correspondence therewith.

13. The system of claim 12, in which a supporting cable extends through the interior of the duct along its top surface between the two points; the cable is fixed at one end relative to one of the points; and means stationary relative to the other point are provided for adjusting the length of the cable between the two points as the length of the duct changes.

14. The system of clim 12, in which a tube surrounds the duct and is fixed relative to one point of the duct so the duct moves into the interior of the tube as the length of the duct decreases.

References Cited

UNITED STATES PATENTS

| | | | |
|---|---|---|---|
| 984,553 | 2/1911 | Gay | 62—237 X |
| 1,792,368 | 2/1931 | Gay | 62—237 |
| 2,480,441 | 8/1949 | Bingham | 98—43 |
| 2,538,382 | 1/1951 | Reilly | 62—237 |
| 2,824,575 | 2/1958 | Rosen | 285—61 |
| 3,360,954 | 1/1968 | Snider | 62—259 |

WILLIAM J. WYE, *Primary Examiner.*

Disclaimer 3,399,545.—*Gordon K. Anderson*, Tustin, *Richard A. Evans*, Newport Beach, and *Ralph H. Hilmer*, Corona Del Mar, Calif. APPARATUS FOR CONNECTING A STATIONARY AIR CONDITIONING UNIT TO AIRCRAFT. Patent dated Sept. 3, 1968. Disclaimer filed May 20, 1985, by the assignee, *Lear Siegler, Inc.*

Hereby enters this disclaimer to claims 1, 7, 8, 12 and 14 of said patent.
[*Official Gazette February 25, 1986.*]

REEXAMINATION CERTIFICATE (639th)//United States Patent [19]

[11] B1 3,399,545

Anderson et al.

[45] Certificate Issued  Mar. 10, 1987

[54] APPARATUS FOR CONNECTING A STATIONARY AIR CONDITIONING UNIT TO AIRCRAFT

[75] Inventors: Gordon K. Anderson, Tustin; Richard A. Evans, Newport Beach; Ralph H. Hilmer, Corona Del Mar, all of Calif.

[73] Assignee: Lear Siegler, Inc., Santa Monica, Calif.

Reexamination Request:
No. 90/000,786, May 20, 1985

Reexamination Certificate for:
Patent No.: 3,399,545
Issued: Sep. 3, 1968
Appl. No.: 640,604
Filed: May 23, 1967

Disclaimer of claims 1, 7, 8, 12 and 14 filed: May 20, 1985 (1063 O.G. 44)

[51] Int. Cl.⁴ .................................... F25D 15/00
[52] U.S. Cl. .................................... 62/237; 14/71.5; 62/239; 98/39.1; 138/106; 285/61; 285/302
[58] Field of Search ........................ 62/237

[56] References Cited
U.S. PATENT DOCUMENTS

| | | |
|---|---|---|
| 648,741 | 5/1900 | Hartley . |
| 770,550 | 9/1904 | Bayly . |
| 984,553 | 2/1911 | Gay . |
| 1,359,876 | 11/1920 | Davidson . |
| 1,370,252 | 3/1921 | Williams . |
| 1,505,121 | 8/1924 | Allport . |
| 1,517,664 | 12/1924 | Bergquist . |
| 1,792,368 | 10/1931 | Gay . |
| 2,115,482 | 4/1938 | Crewe .................. 128/145 |
| 2,452,941 | 11/1948 | Little ...................... 98/68 |
| 2,480,441 | 6/1945 | Bingham ................ 98/43 |
| 2,538,382 | 1/1951 | Reilly ..................... 62/24 |
| 2,565,296 | 8/1951 | Chyle ..................... 285/90 |
| 2,614,478 | 10/1952 | Herman, Jr. ............ 98/2 |
| 2,657,074 | 10/1953 | Schwester et al. ..... 285/90 |
| 2,683,407 | 7/1954 | Takach .................... 98/2 |
| 2,694,537 | 11/1954 | Reichert ................ 244/118 |
| 2,703,733 | 3/1955 | Stueven ................. 302/37 |
| 2,775,927 | 1/1957 | Wulle ..................... 98/40 |
| 2,824,575 | 7/1954 | Rose ...................... 138/25 |
| 3,143,146 | 8/1964 | Kennedy ............... 138/107 |
| 3,360,954 | 1/1968 | Snider et al. ........... 62/259 |
| 3,521,316 | 7/1970 | Adams et al. .......... 14/71 |
| 3,859,481 | 1/1975 | Sprague ................ 191/12 R |
| 4,357,860 | 11/1982 | Krzak .................... 98/33 R |

Primary Examiner—Lloyd L. King

[57] ABSTRACT

A longitudinally expandable duct is attached to the two relatively movable end sections of a telescoping, aircraft passenger-loading bridge. Thus, the conduit is integrated with the bridge structure as a single unit, changing in length with the bridge as the bridge is extended and contracted. A supporting cable under tension extends through the interior of the duct along the top surface thereof. Preferably, one end of the cable is attached to the duct at one end, and at the other, it is wrapped around a reel that maintains a constant tension on the cable. In its contracted condition, the duct is stored in a tube attached to the bridge. One end of the duct is fixed relative to the tube, and the other end of the duct emerges from the tube as the bridge is extended.

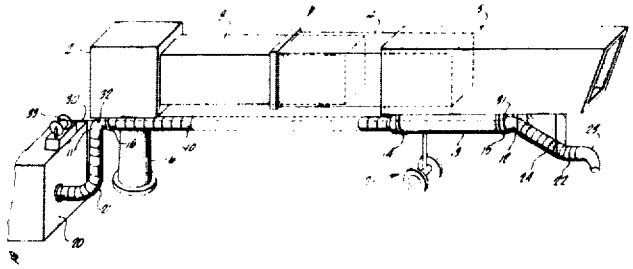

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2–6, 10, 11, and 13 is confirmed.

Claims 1, 7, 8, 12 and 14 are now disclaimed.

Claim 9 is cancelled.

\* \* \* \* \*